UNITED STATES PATENT OFFICE 2,215,250

THERMOPLASTIC MOLDING COMPOSITION

William W. Pedersen, Midland, Mich., assignor to The Dow Chemical Company, Midland, Mich., a corporation of Michigan No Drawing. Application February 27, 1939, Serial No. 258,729

4 Claims. (Cl. 106—40)

This invention concerns new thermoplastic molding compositions comprising ethyl cellulose as the plastic base material.

In the compression or injection molding of ethyl cellulose and other cellulose derivative plastic compositions, considerable difficulty is encountered because of the tendency of such compositions to adhere to the molding die. Ejection of the molded article from the die not only requires considerable force, but in some cases, may damage the article to such an extent that it is entirely unsatisfactory. Furthermore, the surface of the molding lacks the gloss or lustre desired in molded plastic articles and is easily scratched or marred.

Because of these difficulties, it has become common practice to incorporate into molding compositions a lubricating agent which will facilitate ejection of the molded article from the die. Among the substances which have been employed for this purpose are stearic acid, beeswax, carnauba wax, paraffin, aluminum palmitate, etc. Many of such materials, however, are not satisfactory for use as mold lubricants in ethyl cellulose molding compositions, since they are compatible with ethyl cellulose at molding temperatures and do not remain on the surface of the composition in sufficient quantity to effect the desired degree of lubrication. Others of these materials have a tendency to crystallize out of the composition upon aging, thereby causing blushing or blooming of the molded article. Others impart a sticky or greasy feel to the surface of the molded article. Still others seem to react chemically with the ethyl cellulose, causing surface embrittlement.

I have now found that highly refined mineral oil, such as that commonly referred to as "white oil," "liquid petrolatum," etc., is particularly well-adapted to be employed as a lubricating agent in ethyl cellulose molding compositions. This type of oil is a neutral, water-white, odorless petroleum fraction having a flash point of about 370°–425° F., a Saybolt viscosity of about 280–350 seconds at 100° F., a viscosity index of about 60 and a specific gravity of about 0.883 at 60/60° C. Such an oil is sufficiently incompatible with ethyl cellulose that it forms a thin lubricating layer on the surface of the molding immediately upon cooling, thereby permitting easy ejection of the molded article from the die. The presence of the oil in the composition also imparts to the molded article a hard, smooth, lustrous surface which is not easily scratched and which does not blush upon aging. The oil does not tend to bloom out of the composition even at temperatures as low as −40° C.

The new molding compositions comprising ethyl cellulose and a highly refined mineral oil are conveniently prepared by heat-colloiding the ethyl cellulose and oil on compounding rolls or in a Banbury-type mixer, with or without the aid of solvents, until a homogeneous mixture is obtained. In accordance with usual practice, plasticizing agents, such as dibutyl phthalate, tricresyl phosphate, triacetin, di-(ortho-xenyl) mono-phenyl phosphate, etc., as well as various dyes, fillers, pigments, and other addition agents, are also usually incorporated into the composition. The oil is usually employed in an amount representing approximately 0.5–12, preferably 2–5, per cent by weight of the ethyl cellulose, although somewhat larger proportions may be employed if desired.

The following examples will illustrate several ways in which the principle of the invention has been applied, but are not to be construed as limiting the same.

Example 1

A plasticized ethyl cellulose composition was prepared by mixing 100 grams of ethyl cellulose, 15 grams of di-(ortho-xenyl) mono-phenyl phosphate, and 150 grams of a mixed solvent consisting of 2 parts of benzol and 1 part methanol. The composition was broken into small pieces and was dried at 50° C. It was then placed on a heated two-roll colloiding mill and mixed until it had become completely softened and slightly pasty. 4 grams of a highly refined mineral oil having the following characteristics:

| | |
|---|---|
| Flash point | 400° F. |
| Saybolt viscosity at 100° F | 322 sec. |
| Viscosity index | 59 |
| Specific gravity at 60/60° C | 0.8828 |
| Acidity (Mg. KOH/gm.) | 0.025 |
| Color | Water-white |
| Odor | None | was then added gradually to the softened plastic and colloiding was continued until the oil was completely dispersed. The composition was then removed from the rolls, cooled, and ground to form a molding powder. Articles molded from this composition were easily ejected from the molding die and had a hard, smooth, glossy surface of good scratch resistance.

Example 2

100 parts of ethyl cellulose, 15 parts of di-(ortho-xenyl)-phosphate, 4 parts of white mineral oil, and 150 parts of a benzol-methanol mixture (2:1) were mixed in a Banbury mixer. After drying at 50° C. the composition was heat-colloided on compounding rolls and was then ground to form a molding powder which had approximately the same molding characteristics as that prepared in Example 1.

Other modes of applying the principle of my invention may be employed instead of those explained, change being made as regards the ingredients employed, provided the product stated by any of the following claims or the equivalent of such stated product be obtained.

I therefore particularly point out and distinctly claim as my invention:

1. A thermoplastic molding composition comprising ethyl cellulose and, as a mold lubricant therefor, a small proportion of a neutral refined mineral oil.

2. A thermoplastic molding composition comprising ethyl cellulose and, as a mold lubricant therefor, from about 0.5 to about 12 per cent by weight of the ethyl cellulose of a neutral refined mineral oil.

3. A thermoplastic molding composition comprising ethyl cellulose, a plasticizing agent, and a small proportion of a mold lubricant comprising a neutral refined mineral oil.

4. A thermoplastic molding composition comprising ethyl cellulose, a plasticizing agent, and from about 0.5 to about 12 per cent by weight of the ethyl cellulose of a mold lubricant comprising a neutral refined mineral oil.

WILLIAM W. PEDERSEN.